(12) United States Patent
Lin et al.

(10) Patent No.: US 6,347,115 B1
(45) Date of Patent: Feb. 12, 2002

(54) METHOD AND SYSTEM FOR PREDICTIVE CODING OF IMAGES TREATED WITH THE ROBERTS METHOD

(75) Inventors: Ying-Wei Lin, Penfield; Zhigang Fan, Webster, both of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/081,788

(22) Filed: May 20, 1998

(51) Int. Cl.[7] ............................................. H04B 1/66
(52) U.S. Cl. .................. 375/240; 375/240; 375/240.12; 348/415; 348/432.1
(58) Field of Search ........................... 375/240, 240.12; 348/412, 415, 432, 432.1; 370/203

(56) References Cited

U.S. PATENT DOCUMENTS 5,010,405 A * 4/1991 Schreiber et al. ........ 348/432.1
5,291,284 A * 3/1994 Carr et al. .................. 348/415
5,367,516 A * 11/1994 Miller ......................... 370/203

\* cited by examiner

*Primary Examiner*—Chris Kelley
*Assistant Examiner*—Shawn S. An
(74) *Attorney, Agent, or Firm*—Oliff & Berridge, PLC (57) ABSTRACT

The method and system of this invention predictively encodes and decodes an image signal that has been treated with the Roberts Method. The method and system generates a noise signal that is substantially similar to the noise signal generated during the Roberts Method treatment, calculates a range of values for the original image signal based upon an image signal from a different pixel location, predicts the image signal based upon the range of values and the noise signal and calculates an error signal that is encoded. The decoding method and system operates in reverse of the encoding method and system.

26 Claims, 6 Drawing Sheets

METHOD AND SYSTEM FOR PREDICTIVE CODING OF IMAGES TREATED WITH THE ROBERTS METHOD

BACKGROUND OF THE INVENTION

1. Field of Invention

This invention relates to a lossless compression technique and an apparatus in which an image treated with the Roberts method is predictively encoded and decoded.

2. Description of Related Art

There is a class of image compression techniques where the number of bits per pixel of an image is reduced and then the bit reduced image is compressed using lossless techniques. This approach is attractive because the first step significantly reduces the data to be compressed and, therefore, even a moderate compression ratio in the compression step yields a rather high overall compression ratio. For example, if an image is first reduced from 8 bits per pixel to 2 bits per pixel, which is a reduction factor of 4, and a lossless compression technique is applied that provides a compression ratio of 5, then the overall compression ratio is 20. Additionally, if the bit reduction step is performed with the final image quality in mind, then it is possible to achieve a more favorable quality/cost tradeoff.

The bit reduction techniques that are commonly used are thresholding, halftoning and error diffusion. Thresholding is generally good for text and halftoning is generally good for continuous tone images. However, neither thresholding nor half toning is suitable for all image types. Error diffusion is a good general purpose method for processing all types of images and is, therefore, widely used.

SUMMARY OF THE INVENTION

The system and method of this invention uses the Roberts method for the bit reduction method and then predictively encodes the coarsely quantized image. In the Roberts method, a psuedo-random noise is added to an image and the result is coarsely quantized. As an example, pseudo-random noise is added to an 8 bit per pixel image that is coarsely quantized to 2 bits per pixel. This quantization reduces the amount of data by a factor of 4. The knowledge of the generated pseudo-random numbers is then utilized to improve prediction and therefore improve data compression.

BRIEF DESCRIPTION OF THE DRAWINGS

These and other aspects of the invention will become apparent from the following descriptions which illustrate a preferred embodiment of the invention when read in conjunction with the accompanying drawings in which.

DETAILED DESCRIPTION OF PREFERRED EMBODIMENTS

Figure 1:
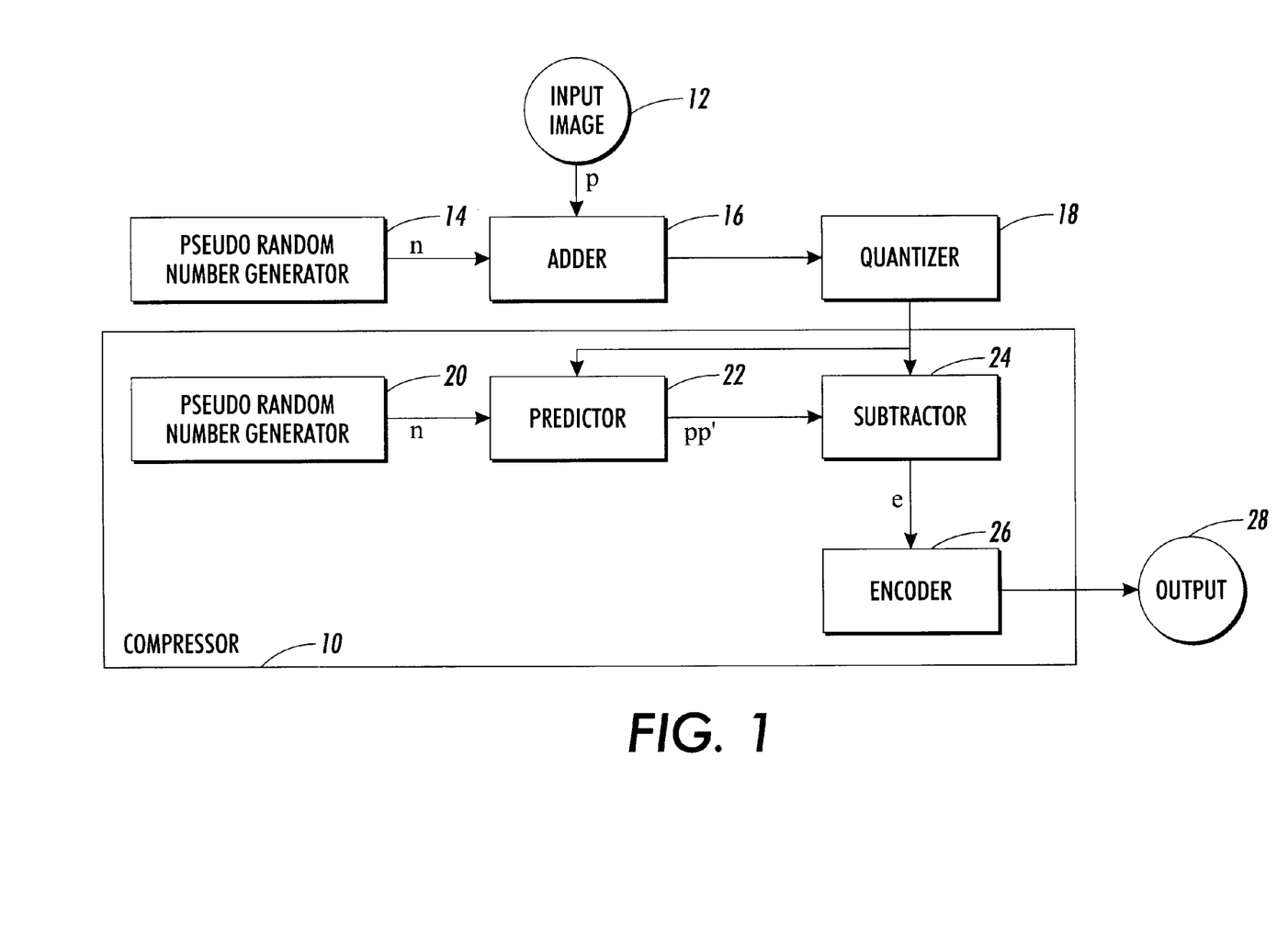
FIG. 1 shows a block diagram of an illustrative apparatus using an inventive compression method of an embodiment of the invention.

A compressor 10 for carrying out the compression method of the invention is shown in FIG. 1. In the following description, variables that are indicated as a prime variable represent quantized values and p[i-1] and p[i] represent the pixel values at locations i-1 and i, respectively. Additionally, the prefix p denotes a prediction of a variable. Thus, for example, pp'[i-1] represents the predicted quantized pixel signal at location i-1.

FIG. 1 shows the Roberts Method being implemented for input image 12 using pseudo-random number generator 14, an adder 16 and a quantizer 18. The pseudo-random number generator 14 generates a pseudo-random number n for each pixel p of the input image 12. The adder 16 adds the pseudo-random number n to the input pixel p and the quantizer 18 quantizes the signal from the adder 16 to reduce the number of bits per pixel and output of quantized pixel signal p'. The compressor 10 of the invention receives the quantized input signal p'and applies that signal p'to a predictor 22 and a subtractor 24. The predictor 22 receives a pseudo-random number n which corresponds to the quantized pixel p'. Pseudo-random number generator 20 generates the pseudo-random number n for each pixel. The predictor 22 generates a predicted quantized pixel signal pp' and applies that signal to subtractor 24. The subtractor 24 generates an error code signal e by subtracting the quantized pixel signal p' from the predicted quantized pixel signal pp'. An encoder 26 encodes the error signal e and outputs the encoded signal at 28.

The pseudo-random number generators 14 and 20 are substantially the same and have substantially the same seed to generate substantially identical pseudo random numbers n.

Figure 2:
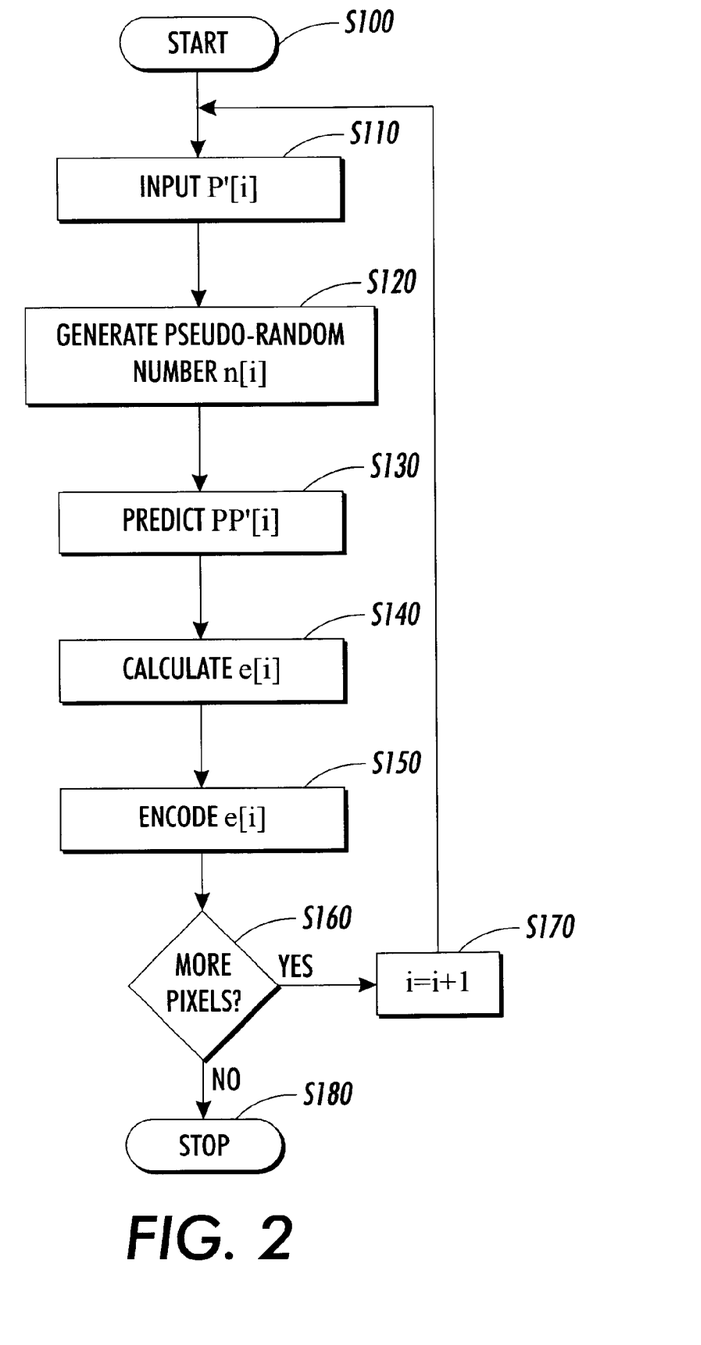
FIG. 2 is a flow chart that outlines the control routine of a compression method of an embodiment of the invention.

FIG. 2 outlines the control routine of the compressor 10 shown in FIG. 1. The control routine starts at step S100 where it continues to step S110. At step S110, the quantized pixel signal p'[i] is input to the adder 16 and the control routine continues to step S120. At step S120, the pseudo-random number generator 20 generates a pseudo-random number n[i] and the control routine continues to step S130.

It is to be understood that steps S110 and S120 may occur in any order as long as both of these steps are computed before step S130.

At step S130, the control routine generates the predicted quantized pixel signal pp'[i] using the predictor 22. The predictor 22 calculates a predicted quantized pixel signal pp'[i] in accordance with the following analysis.

Given p'[i-1] and n[i-1] we know the range of values of p[i-1]. Let this range be represented as R[i-1] and let:

$$R[i-1]=(L[i-1], U[i-1]) \quad (1)$$

where:

L[i-1] is the lower bound of the range; and

U[i-1] is the upper bound of the range.

If we assume that p[i-1] is a good predictor of p[i] then we can assume that R[i-1] is a good predictor of R[i]. Therefore, we let:

$$pR[i]=R[i-1] \quad (2)$$

If we also assume that p[i] has a uniform distribution over (pL[i], pU[i]) then a reasonable estimation of p[i] is its mean value:

$$pp[i] = 0.5(pL[i] + pU[i]) \quad (3)$$
$$= 0.5(L[i-1] + U[i-1])$$

The predictor 22 then quantizes the sum of pp[i] and n[i] to arrive at the predicted quantized pixel signal pp'[i].

The control routine then continues to step S140 where the subtractor 24 subtracts the input quantized pixel value p' from the predicted value pp' to generate an error signal e. The control routine then continues to step S150.

In step S150, the encoder 26 encodes the error signal e using, for example, a run length encoding method. The control routine then continues to step S160 where the control routine determines if more pixels remain to be processed. If the control routine determines that there are more pixels then the control routine continues to step S170. In step S170, the control routine increments the pixel counter [i] by one and the control routine then returns to step S110. If, in step S160 the control routine determines that no more pixels remain then the control routine continues to step S180 where the control routine stops. In this manner, the control routine processes each pixel sequentially until the entire image is processed.

Figure 3:
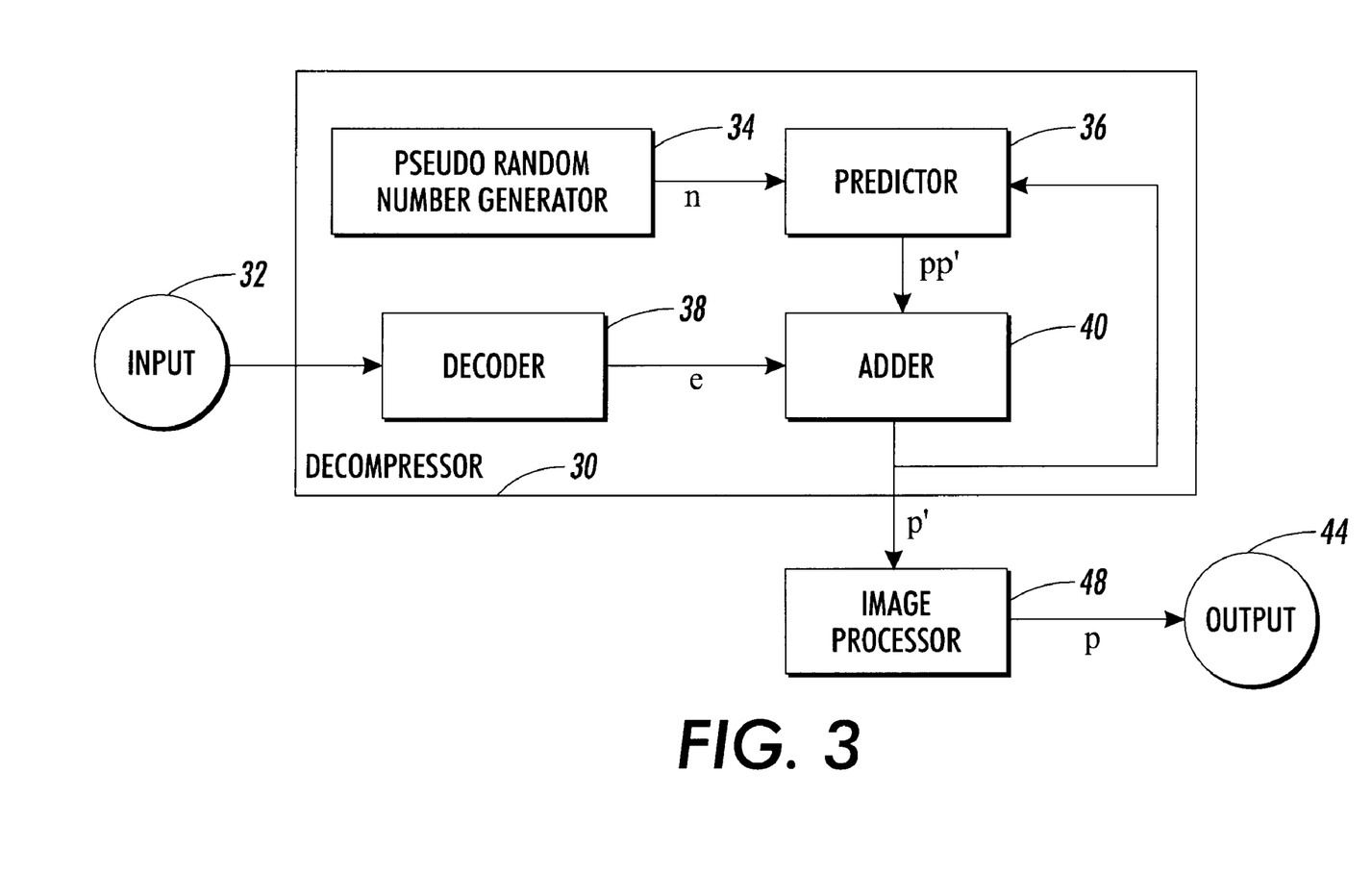
FIG. 3 is a block diagram of an illustrative apparatus using an inventive decompression method of an embodiment of the invention.

FIG. 3 shows a block diagram of an apparatus according to one embodiment of the invention which receives, decodes and decompresses the encoded image that has been transmitted or otherwise sent from the apparatus shown in FIG. 1.

As shown in FIG. 3, decompressor 30 includes a pseudo-random number generator 34, a predictor 36, a decoder 38 and an adder 40. The decoder 38 receives an input coded signal 32, decodes the signal and generates an error signal e[i]. The error signal e[i] is applied to the adder 40. The pseudo-random number generator 34 generates a pseudo-random number n[i] which corresponds to the location of the pixel corresponding to the error signal e[i] and applies the pseudo-random number n[i] to the predictor 36. The predictor 36 generates a predicted quantized pixel value pp'[i] using the pseudo-random number n[i] and the quantized pixel signal p'[i]. The predicted quantized pixel signal value pp'[i] is applied to the adder 40. The adder 40 generates the quantized pixel value p'[i] from the predicted quantized pixel value pp'[i] and the error signal e[i]. The quantized pixel value p'[i] is output from the decompressor 30 to an image processor 42 which generates an output image pixel signal p[i] 44.

The pseudo-random number generator 34 must be identical to the pseudo-random number generator as the pseudo-random number generators 14 and 20 in the apparatus shown in FIG. 1.

Figure 4:
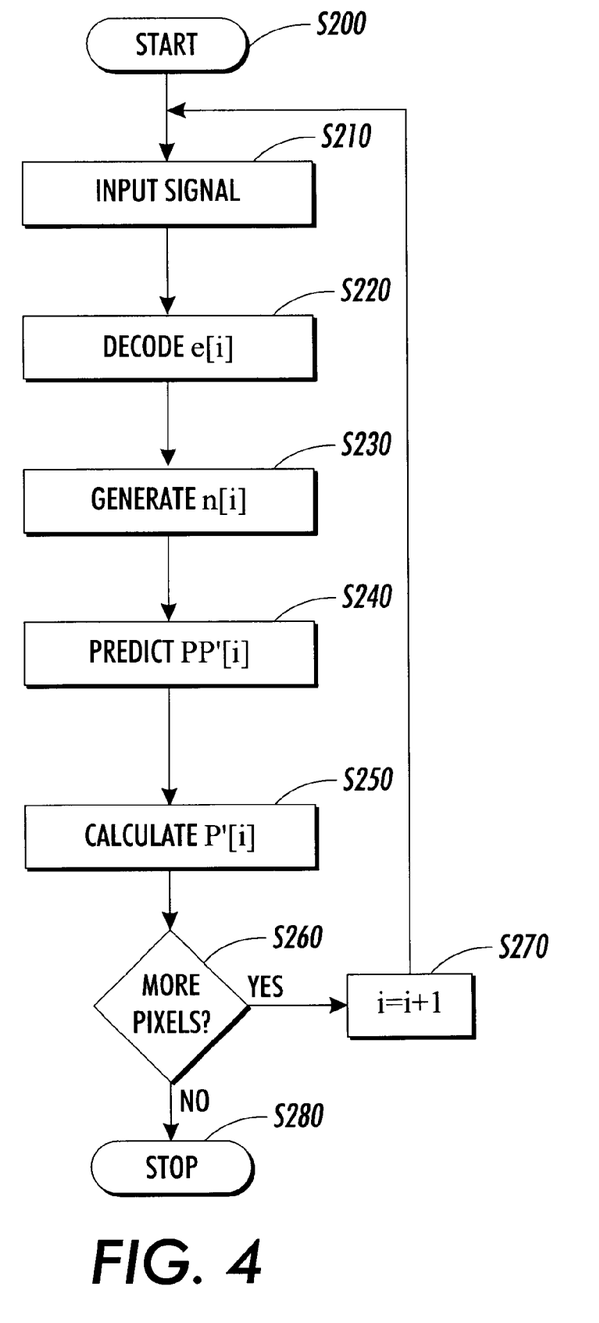
FIG. 4 is a flow chart outlining the control routine of a decompression method of an embodiment of the invention.

FIG. 4 outlines the control routine of the decompressor 30 shown in FIG. 3. The control routine starts at step S200 and continues to step S210. At step S210, the input signal is received and the control routine continues to step S220. At step S220, the decoder 38 decodes the input signal to generate an error signal e[i]. The control routine then continues to step S230 where the pseudo-random number generator 34 generates a pseudo-random number n[i] and the control routine continues to step S240.

In step S240, the predictor 36 predicts a quantized pixel signal pp'[i] using the previous quantized pixel value p'[i−1] and the previous pseudo-random number n[i−1] in the same manner as described above in connection with the predictors 22 of the compressor 10. The control routine then continues to step S250.

In step S250, the adder 40 calculates the quantized pixel value p'[i] by adding the decoded error signal e[i] from the predicted quantized pixel value pp'[i]. The control routine then continues to step S260 where the control routine determines if more pixels remain in the image that require processing. If the control routine determines in step S260 that more pixels require processing then the control routine continues to step S270. In step S270 the control routine increments the pixel counter [i] by one and the control routine returns to step S210. If in step S260 the control routine determines that no more pixels remain to be processed in the image then the control routine continues to step S280 where the control routine stops.

The principles described above can be extended to multiple-neighborhood pixel locations and still be within the scope of this invention. In other words, the prediction method may be extended to predict the quantized pixel signal p'[i] from:

$$n[1], p'[i-1], n[i-1], p'[i-2], n[i-2] \ldots p'[i-m], n[i-m]$$

where m is the size of the neighborhood.

Figure 5:
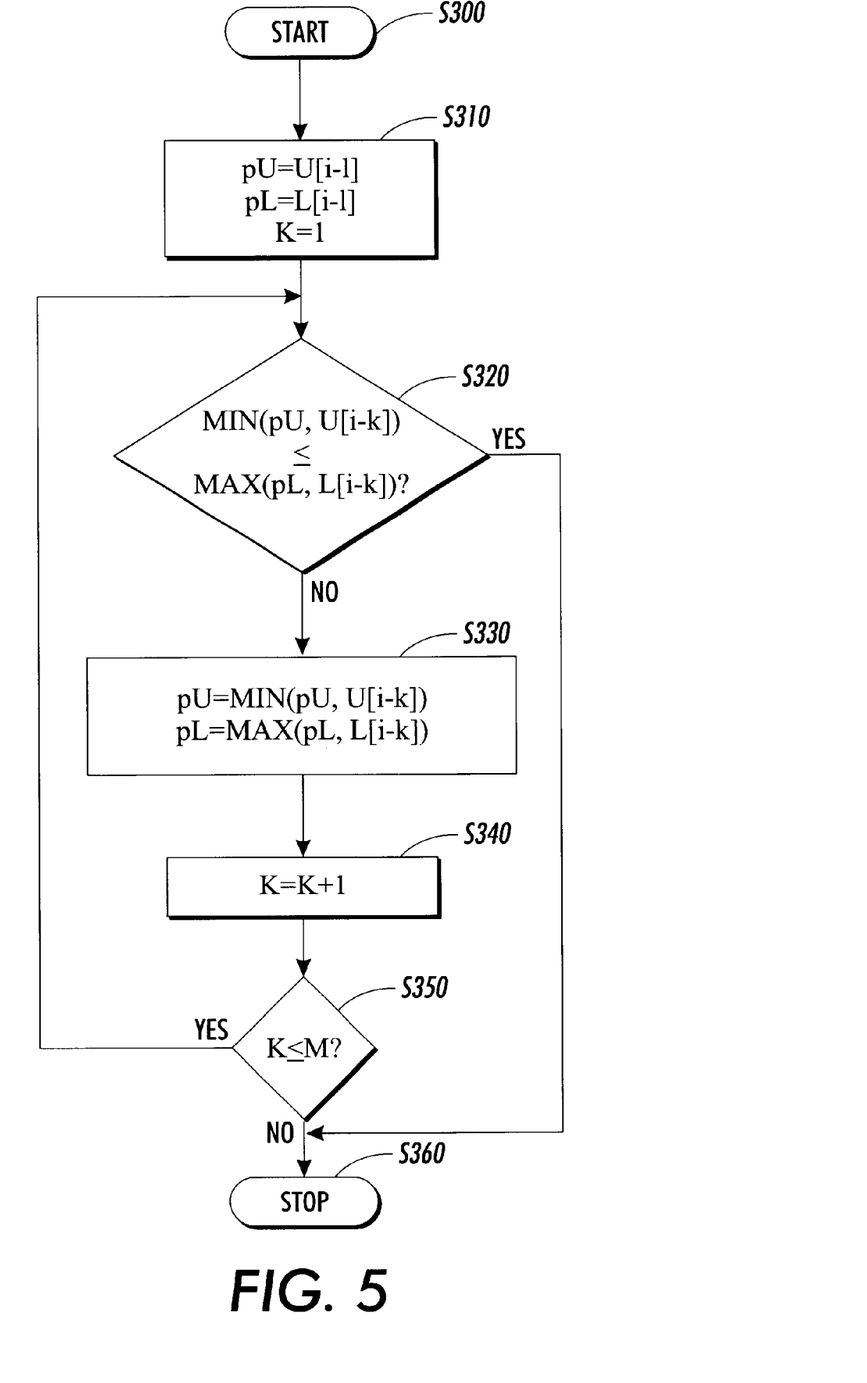
FIG. 5 is a flow chart outlining the control routine for the evaluation of range information for multiple-neighborhood pixel locations in accordance with this invention.

The range information about p[i−k] for k=1,2, ..., m is evaluated in the same manner as before but with the control routine outlined in FIG. 5.

In FIG. 5 the control routine starts at step S300 and continues to step S310. At step S310, the control routine sets pU=U[i−1], pL=L[i−1] and K=1 and the control routine continues to step S320. In step S320, the control routine determines if min (pU, U[i−k])≦max (pL, L[i−k]). If in step S320 this is true, then the control routine jumps to step S360 where the control routine stops. If, however, in step S320 the control routine determines that this is not true, then the control routine continues to step S330.

In step S330, the control routine sets pU=min (pU, U[i−k]) and pL=max (pL, L[i−k]) and the control routine continues to step S340. In step S340, the control routine sets k=k+1 and the control routine continues to step S350. In step S350, the control routine determines whether k<m. If, in step S350, k<m, then the control routine returns to step S320. Alternatively, in step S350, if the control routine determines that k is not ≦m, then the control routine continues to step S360 where the control routine stops.

Note that min (pU, U[i−k])≦max (pL, L[i−k]) indicates a conflict in ranges which implies the existence of an edge. The range information of pixels i−k and beyond is not used for prediction.

The output of the control routine of FIG. 5 is (pL, pU) which is the prediction range for p[i]. Then pp'[i] is calculated by quantizing:

$$0.5(pL+pU)+n[i]$$

For two-dimensional prediction, the control routine of FIG. 5 is applied for N lines. The predicted ranges are then combined again using the control routine of FIG. 5.

Figure 6:
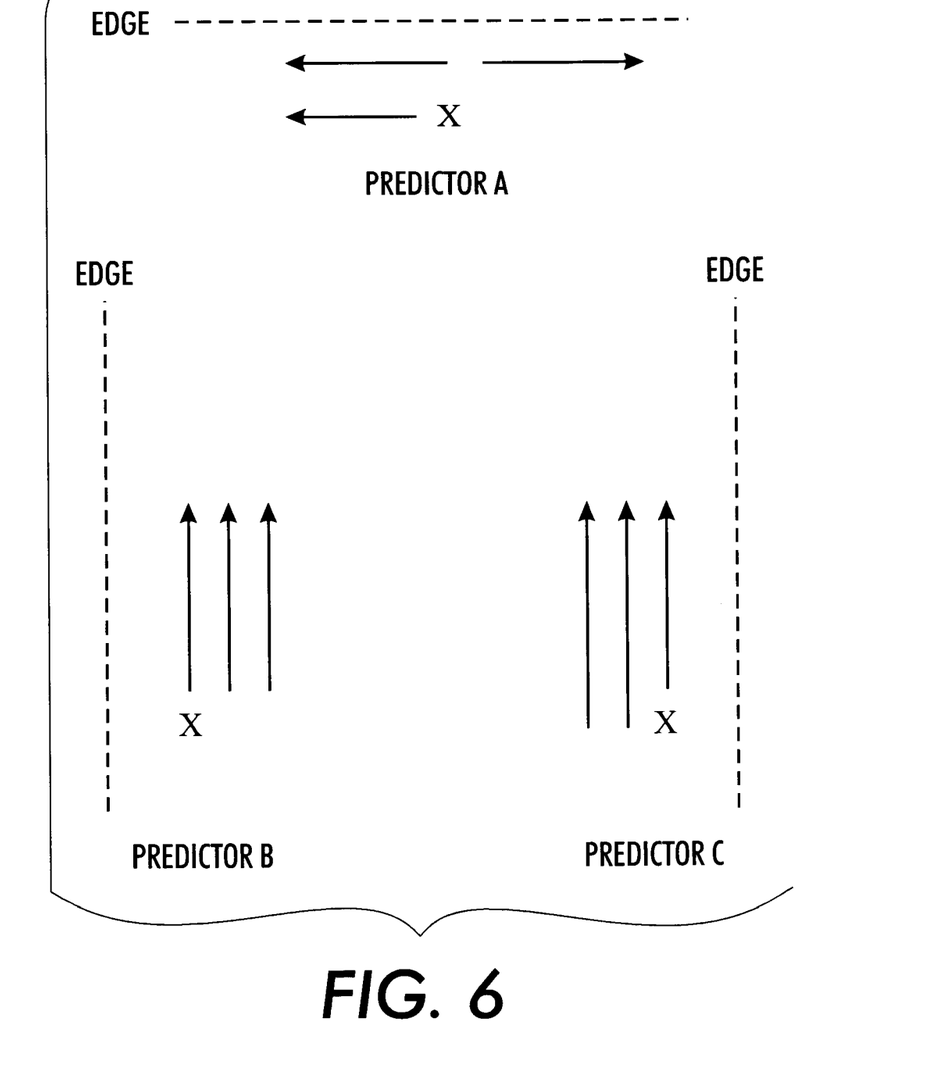
FIG. 6 shows predictors for an illustrative two-dimensional predictive compression method of an embodiment of this invention.

Another embodiment of the invention uses several predictors, each of which is tailored to fit one of the edge configurations. FIG. 6 shows an example where three predictors are used. The resulting ranges of the three predictors are combined again by algorithm 1.

The output 44 of the decompressor 30 of FIG. 3 may be sent directly to a printer with low bit per pixel capability and directly printed by that printer. Alternatively, the image may be further processed with a compact dot growth algorithm to coalesce gray pixels with black pixels to improve the image quality.

Another alternative is to again apply the Roberts method by subtracting the random numbers n from the image to form a higher bit per pixel image. This high bit per pixel image can also be further processed with a low pass digital filter to reduce the effect of add-quantize-subtract noise, and then halftoned as appropriate for a printer.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A method for coding an image signal that is based upon the quantized sum of an original image signal and a first noise signal, comprising:

inputting the image signal as a first image signal;

generating a second noise signal;

calculating at least one first range of values for the original image signal based upon an image signal from a different pixel location;

predicting at least one first image signal based upon the at least one first range of values and the second noise signal;

calculating an error signal based upon the predicted at least one first image signal and the input image signal; and encoding the error signal.

2. The method of claim 1, wherein the second noise signal is identical to the first noise signal.

3. The method of claim 2, wherein the second noise signal is generated by a second pseudo-random number generator that is identical to a first pseudo-random number generator that generates the first noise signal.

4. The method of claim 3, wherein the second pseudo-random number generator is identical to the first pseudo-random number generator, and wherein the seed to the first pseudo-random number generator is identical to the seed for the second pseudo-random number generator.

5. The method of claim 1, wherein the error signal is calculated by subtracting the image signal from the predicted at least one first image signal.

6. The method of claim 1, wherein the error signal is encoded by a run-length encoding method.

7. The method of claim 1, wherein the predicted image signal is a combination of a plurality of predicted at least one first image signals.

8. The method of claim 7, wherein each of the plurality of predicted image signals corresponds to an edge configuration.

9. The method of claim 1, further comprising:

decoding the error signal;

generating a third noise signal;

calculating a second range of values for the original image signal based upon the image signal from a different pixel location;

predicting at least one second image signal based upon the second range of values and the third noise signal; and adding the error signal to the second image signal.

10. The method of claim 9, wherein the third noise signal is identical to the first and second noise signals.

11. The method of claim 10, wherein the third noise signal is generated by a third pseudo-random number generator that is identical to the first and second pseudo-random number generators.

12. The method of claim 11, wherein the third pseudo-random number generator is identical to the first and second pseudo-random number generators wherein the seeds to the first and second pseudo-random number generators are identical to the seed in the third pseudo-random number generator.

13. The method of claim 1, wherein each of the at least one first image signal corresponds to at least one edge configuration.

14. The method of claim 9, wherein each of the at least one second image signal corresponds to at least one edge configuration.

15. An apparatus for coding an image signal that is based upon the quantized sum of an original image signal and a first noise signal from a first pseudo-random number generator, the apparatus comprising:

a second pseudo-random number generator for generating a second noise signal;

at least one first predictor for calculating at least one first range of values for the original image signal based upon an image signal from a different pixel location and for predicting a first image signal using the at least one first range of values and the second noise signal;

an error signal generator for generating an error signal that is based upon the predicted first image signal and the input image signal; and an error signal encoder for encoding the error signal from the error signal generator.

16. The apparatus of claim 15, wherein the second pseudo-random number generator is substantially similar to the first pseudo-random number generator.

17. The apparatus of claim 16, wherein the second pseudo-random number generator is identical to the first pseudo-random number generator, and wherein the second pseudo-random number generator uses a seed that is identical to the seed of the first pseudo-random number generator.

18. The apparatus of claim 15, wherein the error signal generator comprises a subtractor for subtracting the image signal from the predicted image signal.

19. The apparatus of claim 15, wherein the error signal encoder comprises a run-length encoder.

20. The apparatus of claim 15, wherein each of the at least one first predictors generate a predicted image signal that corresponds to an edge configuration.

21. The apparatus of claim 15, further comprising:

a decoder for decoding the encoded error signal;

a third pseudo-random number generator for generating a third noise signal;

at least one second predictor for calculating at least one second range of values for the original image signal based upon the image signal from a different pixel location and for predicting a second image signal using the at least one second range of values and the third noise signal; and an adder for adding the error signal to the second image signal.

22. The apparatus of claim 21, wherein the third pseudo-random number generator is substantially similar to the first and the second pseudo-random number generators.

23. The apparatus of claim 22, wherein the third pseudo-random number generator is identical to the first and second pseudo-random number generators and wherein the seed to the third pseudo-random number generator is identical to the seeds of the first and second pseudo-random number generators.

24. The apparatus of claim 15, wherein each of the at least one second predictor generates a predicted image signal that corresponds to at least one edge configuration.

25. A method for decoding an encoded image error signal, wherein the error signal is based upon a predicted at least one first image signal and an input image signal, wherein the predicted at least one first image signal is based on at least one first range of values and a first noise signal, wherein the at least one first range of values is based upon an original image signal from a different pixel location, wherein the image signal is based upon the quantized sum of an original image signal and a second noise signal, the method comprising:

- decoding the error signal;
- generating a third noise signal;
- calculating a second range of values for the original image signal based upon the image signal from a different pixel location;
- predicting at least one second image signal based upon the second range of values and the third noise signal; and
- adding the error signal to the second image signal.

26. An apparatus for decoding an encoded image error signal, wherein the error signal is based upon a predicted at least one first image signal and an input image signal, wherein the predicted at least one first image signal is based on at least one first range of values and a first noise signal, wherein the at least one first range of values is based upon an original image signal, from a different pixel location, wherein the image signal is based upon the quantized sum of an original image signal and a second noise signal, the apparatus comprising:

- a decoder for decoding the inputted image error signal;
- a pseudo-random number generator for generating a third noise signal;
- at least one predictor for calculating at least one second range of values for the original image signal based upon the image signal from a different pixel location and for predicting a second image signal using the at least one second range of values and the third noise signal; and
- an adder for adding the error signal to the second image signal.

* * * * *